United States Patent [19]
Hart

[11] Patent Number: 5,927,313
[45] Date of Patent: Jul. 27, 1999

[54] VALVE LOCKING DEVICE AND METHOD

[76] Inventor: Douglas R. Hart, 7825 N. Alton Ave., Indianapolis, Ind. 46268

[21] Appl. No.: 08/941,838

[22] Filed: Oct. 1, 1997

[51] Int. Cl.$^6$ .................................................... F16K 35/00
[52] U.S. Cl. ............................ 137/15; 137/382; 220/724
[58] Field of Search ............................ 220/724; 137/382, 137/368; 411/353, 517, 518; 285/321; 403/326

[56] References Cited

U.S. PATENT DOCUMENTS

| | | |
|---|---|---|
| 1,223,345 | 4/1917 | Norwalk . |
| 2,126,897 | 8/1938 | Lamar ...................................... 251/155 |
| 2,580,343 | 12/1951 | Benoit ...................................... 152/427 |
| 2,638,956 | 5/1953 | Nelson et al. ........................... 152/428 |
| 4,004,684 | 1/1977 | Scollins ........................................ 206/3 |
| 4,095,713 | 6/1978 | Norton ...................................... 220/270 |
| 4,248,262 | 2/1981 | Iwanaga ................................... 137/382 |
| 4,269,221 | 5/1981 | Adams ..................................... 137/383 |
| 4,378,321 | 3/1983 | Miller ..................................... 261/41 D |
| 4,476,988 | 10/1984 | Tanner ...................................... 220/1.5 |
| 4,690,167 | 9/1987 | Skipper ..................................... 137/382 |
| 4,955,404 | 9/1990 | Pitzen ......................................... 137/15 |
| 5,195,720 | 3/1993 | Nortier et al. ...................... 251/129.04 |
| 5,205,312 | 4/1993 | Jerman ........................................ 137/15 |
| 5,240,043 | 8/1993 | Campbell ................................. 137/899 |

*Primary Examiner*—A. Michael Chambers
*Assistant Examiner*—Paul Coryea
*Attorney, Agent, or Firm*—Plews Shadley Racher & Braun

[57] ABSTRACT

A valve locking device has a rigid covering member with an axial bore extending inside it. The bottom of the covering member has an annular skirt, and an annular groove is formed in the interior wall of the skirt. A resilient retaining ring with opposite terminal ends resides in the groove. The groove has a diameter greater than the outer diameter of the retaining ring so that the ring can be expanded radially within the groove to the extent that the interior diameter of the retaining ring is larger than the diameter of the axial bore. The skirt portion of the covering member has a cut out for accessing the terminal ends of the retaining ring with retaining ring pliers. The terminal ends of the ring have bores for receiving tines on the pliers.

18 Claims, 1 Drawing Sheet

VALVE LOCKING DEVICE AND METHOD

BACKGROUND

The present invention pertains to covers for valve assemblies and more particularly pertains to a valve locking device and method for use on a valve assembly of the type having a valve stem and a cap for covering the stem.

Valve assemblies of the type having a valve stem adapted for extending through an aperture in a container are known in the art. Such valves may include a needle and coil spring assembly enclosed within the stem, like the Norwalk device disclosed in U.S. Pat. No. 1,223,345. When the needle is compressed, the pressurized fluid escapes through the valve stem.

Such valves are conventionally used on containers for storing pressurized fluid used in medicine and industry, including industrial chemical plants, refineries, utilities and the like. Nitrous Oxide ($N_2O$) for example, is used by dentists for its anesthetic properties. When inhaled it produces a loss of sensibility to pain preceded by exhilaration and sometimes laughter. Other gasses, however, are not so widely renowned for their intoxicating effect on an individual when inhaled. One such class of gasses is Freon, which includes any one of various nonflammable gaseous and liquid fluorinated hydrocarbons used as refrigerants and as propellants for aerosols. Numerous deaths, mostly to young people, throughout the U.S. have been directly attributed to inhaling Freon.

Thus, a locking device is needed for locking the valve fitted on the containers that store these and other gasses, which are more frequently being used as inhalants. Of course, in addition to preventing the abuse of these gaseous substances, such locking device would prevent unauthorized access to any substance contained by such valves. Although some valves have caps in order to protect the fragile nature of the valve and its needle, caps may be easily removed. Additionally, valve locking devices heretofore available have too many separate and small parts that have to be manipulated by hand and which can become lost. Finally, a valve locking device must be inexpensive to manufacture, easy to operate and capable of retrofitting onto existing valve assemblies and caps.

Therefore, it is highly desirable to provide a new valve locking device and method.

It is also highly desirable to provide a valve locking device and method for use on a valve assembly of the type having a valve stem and a cap for covering the stem.

It is also highly desirable to provide a valve locking device and method that does not include too many separate and small parts that have to be manipulated by hand and which can become lost.

It is also highly desirable to provide a new valve locking device and method which is inexpensive to manufacture, easy to operate and can be retrofitted onto existing valve assemblies and caps.

It is finally highly desirable to provide a new valve locking device and method which meet all of the above desired features.

SUMMARY

Therefore, it is an object of the invention to provide a new valve locking device and method.

It is also an object of the invention to provide a valve locking device and method for use on a valve assembly of the type having a valve stem and a cap for covering the stem.

It is also an object of the invention to provide a valve locking device and method that does not include too many separate and small parts that have to be manipulated by hand and which can become lost.

It is also an object of the invention to provide a new valve locking device and method which is inexpensive to manufacture, easy to operate and can be retrofitted onto existing valve assemblies and caps.

It is finally an object of the invention to provide a new valve locking device and method which meet all of the above desired features.

In the broader aspects of the invention, there is provided, for use with a valve assembly of the type having a valve stem and a cap for covering the valve stem, a valve locking device for preventing access to the cap. A covering member for covering the cap and a retaining ring for retaining the covering member on the cap is provided. The covering member has an axial bore for enclosing the cap. The axial bore has an interior wall with a groove formed therein for housing the retaining ring. At least a portion of the interior wall of the axial bore is configured in a shape substantially complementary to the cap so that the covering member is free to rotate about an axis with respect to the cap. Additionally, the retaining ring is resilient and has a pair of terminal ends. The retaining ring is free of any connection to the covering member. The axial bore has an interior diameter. The covering member has an annular skirt, and the groove in the interior wall extends radially into the skirt. The groove has a diameter larger than the outer diameter of the retaining ring permitting the retaining ring to be expanded radially within the groove to a size larger than the outer diameter of the cap.

DRAWINGS

The above-mentioned and other features and objects of the invention and the manner of attaining them will become more apparent and the invention itself will be better understood by reference to the following description of an embodiment of the invention taken in conjunction with the accompanying drawings wherein.

DESCRIPTION

Figure 1:
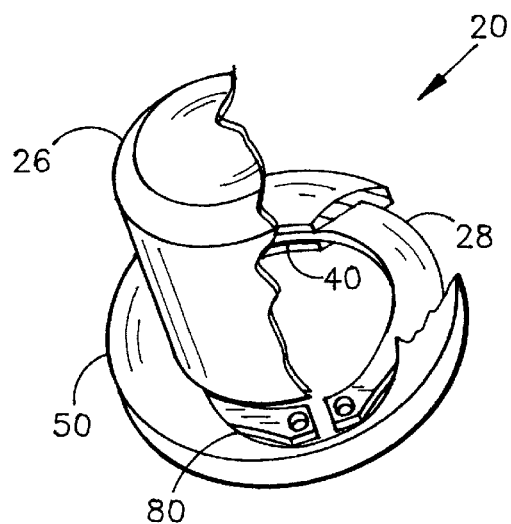
FIG. 1 is an elevated perspective and partial cross-sectional view of the valve locking device of the invention.
Figure 2:
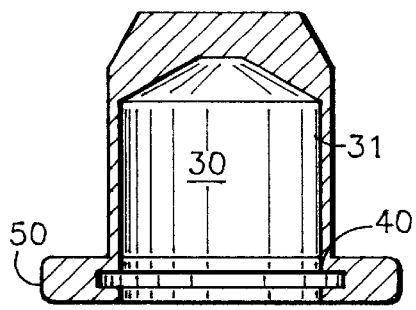
FIG. 2 is a side cross-sectional view of the valve locking device of the invention.

FIG. 1 shows valve locking device 20 of the invention. The device 20 is for use with a valve assembly of the type illustrated in FIG. 4, which has a valve stem 120 and a cap 14 for covering valve stem 120. Valve locking device 20 comprises covering member 26 and retaining ring 28 housed within covering member 26. An axial bore 30 extends through covering member 26 and has interior wall 31 with groove 40 formed therein for housing retaining ring 28. The lower end of covering member 26 has annular skirt 50 with cutout 80 formed therein. Groove 40 extends radially into skirt 50 and has a diameter larger than the outer diameter of retaining ring 28. A portion of interior wall 31 of axial bore 30 is configured in a shape substantially complimentary to cap 14 so that covering member 26 is free to rotate about axis 25 with respect to cap 14, as shown in FIG. 4

Figure 3:
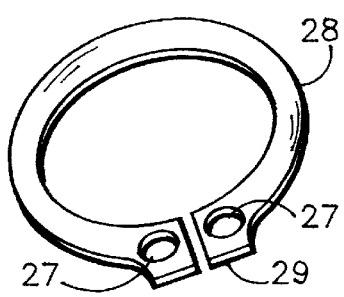
FIG. 3 is an elevated perspective view showing the retaining ring of the invention.

Referring to FIG. 3, retaining ring 28 is substantially rigid and has terminal ends 29 with bores 27 extending therethrough. Retaining ring 28 is free of any connection to covering member 26. Retaining ring 28 is formed from a rigid metal such as steel, including stainless steel or the like and may be coated using means well-known in the art. In an embodiment, retaining ring is formed from steel and is treated with a Zinc coating for treatment against rust and added flexural and tensile strength.

Covering member 26 is substantially rigid and may be formed from brass, aluminum, or metal, metal alloy, or the like. In that embodiment, cutout 80 is produced using cutting methods known in the art after covering member 26 is turned on a lathe. In another embodiment, covering member 26 is made by known injection molding process from glass-reinforced thermoplastic. One such thermoplastic that works well in molding applications is sold under the trademark "VALOX" and has the physical and mechanical properties during and after manufacture which make it the inventor's preferred manufacturing material. In that embodiment groove 40, skirt 50 and cutout 80 are complete when covering member 26 is ejected from a suitable mold, which a skilled artisan may prepare.

Figure 4:
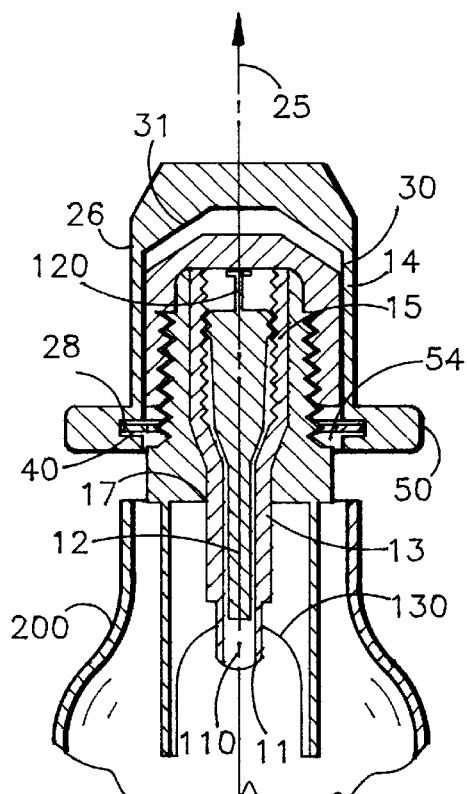
FIG. 4 is a side cross-sectional view showing the valve locking device of the invention secured to a valve assembly, which is mounted onto a container.

Valve locking device 20 may be used with valve assembly of the type shown in FIG. 4 having ferrule 13, valve stem 12, and cap 14. In that assembly, which is not a part of the invention claimed in this application, but which has been provided only to serve as an example of a type of valve assembly with which locking device 20 may be used, ferrule 13 has a threaded shank 15 adapted to extend through aperture 17 in container 200. Axial bore 11 extends through ferrule 13 for sleeving ferrule 13 on valve stem 12. Cap 14 has an outer diameter and is mounted on threaded shank 15 for protecting valve stem 12.

The method for locking valve stem cap 14 from rotational movement comprises the following steps. First, retaining ring 28 is expanded from its closed or resting position, as shown in FIG. 3, to its open position, as shown in FIG. 1. In its closed position, the interior diameter of retaining ring 28 is smaller than the outer diameter of cap 14. The diameter of groove 40 is larger than the outer diameter of retaining ring 28, and because groove 40 extends radially into skirt 50, retaining ring 28 can be expanded radially within groove 40 into its open position, wherein the interior diameter of retaining ring 28 is greater than the diameter of bore 30. To accomplish this, retaining ring pliers are used for expanding retaining ring 28. Similar to needle-nosed pliers, except being designed for internal rather than external use on the work piece, retaining ring pliers (not shown) are well-known in the art. They have upstanding tines, which are positioned in bores 27 in terminal ends 29 of retaining ring 28. Terminal ends are accessible by way of cutout 80, as shown in FIG. 1. Terminal ends 29 are separated with the pliers causing retaining ring 28 to expand radially within groove 40 into its open position, wherein the interior diameter of retaining ring 28 is greater than the diameter of bore 30.

Retaining ring 28 and covering member 26 are positioned over cap 14 and lowered thereon until retaining ring 28 reaches space 54 beneath cap 14 and covering member 26 fully encloses cap 14. Retaining ring pliers may be released permitting retaining ring 28 to resume its original closed position. When retaining ring 28 resumes its original shape, its interior diameter is smaller than the outside diameter of cap 14 such that retaining ring 28 bears against the bottom of cap 14, and the interior diameter of bore 30 in covering member 26 is larger than the outside diameter of cap 14 so that covering member 26 is free to rotate about axis 25 relative to cap 14, thus, preventing rotational movement of cap 14.

The new valve locking device 20 and method may be used on a valve assembly of the type having valve stem 12 and cap 14 for covering stem 12. Covering member 26 houses retaining ring 28 such that valve locking device 20 does not include too many separate and small parts that have to be manipulated by hand and which can become lost. Valve locking device 20 is inexpensive to manufacture, easy to operate using retaining ring pliers known in the art and can be retrofitted onto existing valve assemblies and caps.

While a specific embodiment of the invention has been shown and described herein for purposes of illustration, the protection afforded by any patent which may issue upon this application is not strictly limited to the disclosed embodiment, but extends to all structures and arrangements which fall fairly within the scope of the claims which are appended hereto.

What is claimed is:

1. A method for locking a valve stem cap having an outside diameter from rotational movement comprising the steps of: providing a hollow covering member having skirt wherein said skirt, having a cut out; expanding a substantially rigid retaining ring residing in a groove formed in an interior wall of said covering member into an open position, wherein said retaining ring is accessible by way of said cut out, the retaining ring being free of any connection to the covering member, positioning the retaining ring and the covering member about the cap, permitting the retaining ring to resume its original closed position, wherein the retaining ring having an interior diameter smaller than the outside diameter of the cap, and the interior diameter of the covering member being larger than the outside diameter of the cap, wherein the retaining ring bears against the cap and the covering member is free to rotate about an axis relative to the cap, thereby preventing rotational movement of the cap.

2. The method of claim 1, in which the resilient ring having a pair of enlarged terminal ends accessible via the cut out, wherein the expanding step further comprises spreading the terminal ends of the retainer ring apart with pliers.

3. For use with a valve assembly of the type having a valve stem and a cap for covering the valve stem, a valve locking device for preventing access to the cap comprising: a covering member for covering the cap and a retaining ring with an outer diameter for retaining the covering member on the cap, the covering member having an axial bore for enclosing the cap, the axial bore having an interior wall with a groove formed therein for housing the retaining ring, said groove having a diameter larger than the outer diameter of the retaining ring so that the retaining ring is expandable radially within the groove.

4. The valve locking device of claim 3 wherein at least a portion of the interior wall of the axial bore being configured in a shape substantially complementary to the cap, wherein the covering member is free to rotate about an axis with respect to the cap.

5. The valve locking device of claim 3 wherein the retaining ring being resilient and having a pair of terminal ends, the retaining ring being free of any connection to the covering member.

6. The valve locking device of claim 3 wherein the axial bore having an interior diameter, the covering member having an annular skirt, the groove in the interior wall being extending radially into the skirt, wherein the groove having a diameter larger than the outer diameter of the retaining ring, thereby permitting the retaining ring to be expanded radially within the groove.

7. The valve locking device of claim 3 wherein the covering member is formed from brass.

8. The valve locking device of claim 3 wherein the covering member is formed from rigid plastic.

9. For use with a valve assembly of the type having a ferrule, a valve stem, and a cap, wherein the ferrule having a threaded shank adapted to extend through an aperture in a container, an axial bore extending through the ferrule for sleeving the ferrule on the valve stem, wherein the cap having an outer diameter and being mounted on the threaded shank for protecting the valve stem, a valve locking device for preventing access to the cap comprising:

a hard covering member for covering the cap and a resilient retaining ring with an outer diameter, the covering member having an axial bore for enclosing the cap, and an annular skirt, the axial bore having an interior wall with a groove formed therein for housing the retaining ring, the groove in the interior wall being extending radially into the skirt, wherein the groove having a diameter larger than the outer diameter of the retaining ring, thereby permitting the retaining ring to be expanded radially within the groove, a portion of the interior wall of the axial bore being configured in a shape complementary to the cap and having an interior diameter slightly larger than the outer diameter of the cap, wherein the covering member is free to rotate about an axis with respect to the cap.

10. The valve locking device of claim 9 wherein the covering member is formed from brass.

11. The valve locking device of claim 9 wherein the retaining ring is formed from steel.

12. The valve locking device of claim 11 wherein the covering member is formed from plastic.

13. The valve locking device of claim 11 wherein the covering member is formed from glass-reinforced plastic.

14. For use with a valve assembly of the type having a ferrule, a valve stem, and a cap, wherein the ferrule having a threaded shank adapted to extend through an aperture in a container, an axial bore extending through the ferrule for sleeving the ferrule on the valve stem, wherein the cap having an outer diameter and being mounted on the threaded shank for protecting the valve stem, a valve locking device for preventing access to the cap comprising a hard covering member for covering the cap and a resilient retaining ring with an outer diameter, said covering member having an axial bore for enclosing the cap, and an annular skirt, said skirt having a cut out for accessing the retaining ring, the axial bore having an interior wall with a groove formed therein for housing the retaining ring, the groove in the interior wall being extending radially into the skirt, wherein the groove having a diameter larger than the outer diameter of the retaining ring, thereby permitting the retaining ring to be expanded radially within the groove, a portion of the interior wall of the axial bore being configured in a shape complementary to the cap and having an interior diameter slightly larger than the outer diameter of the cap, wherein the covering member is free to rotate about an axis with respect to the cap.

15. The valve locking device of claim 14 wherein the covering member is formed from brass.

16. The valve locking device of claim 14 wherein the retaining ring is formed from steel.

17. The valve locking device of claim 16 wherein the covering member is formed from plastic.

18. The valve locking device of claim 16 wherein the covering member is formed from glass-reinforced plastic.

\* \* \* \* \*